March 5, 1968 H. L. BOWDITCH ET AL 3,371,862
FORCE BALANCE APPARATUS
Original Filed July 2, 1965 7 Sheets-Sheet 1
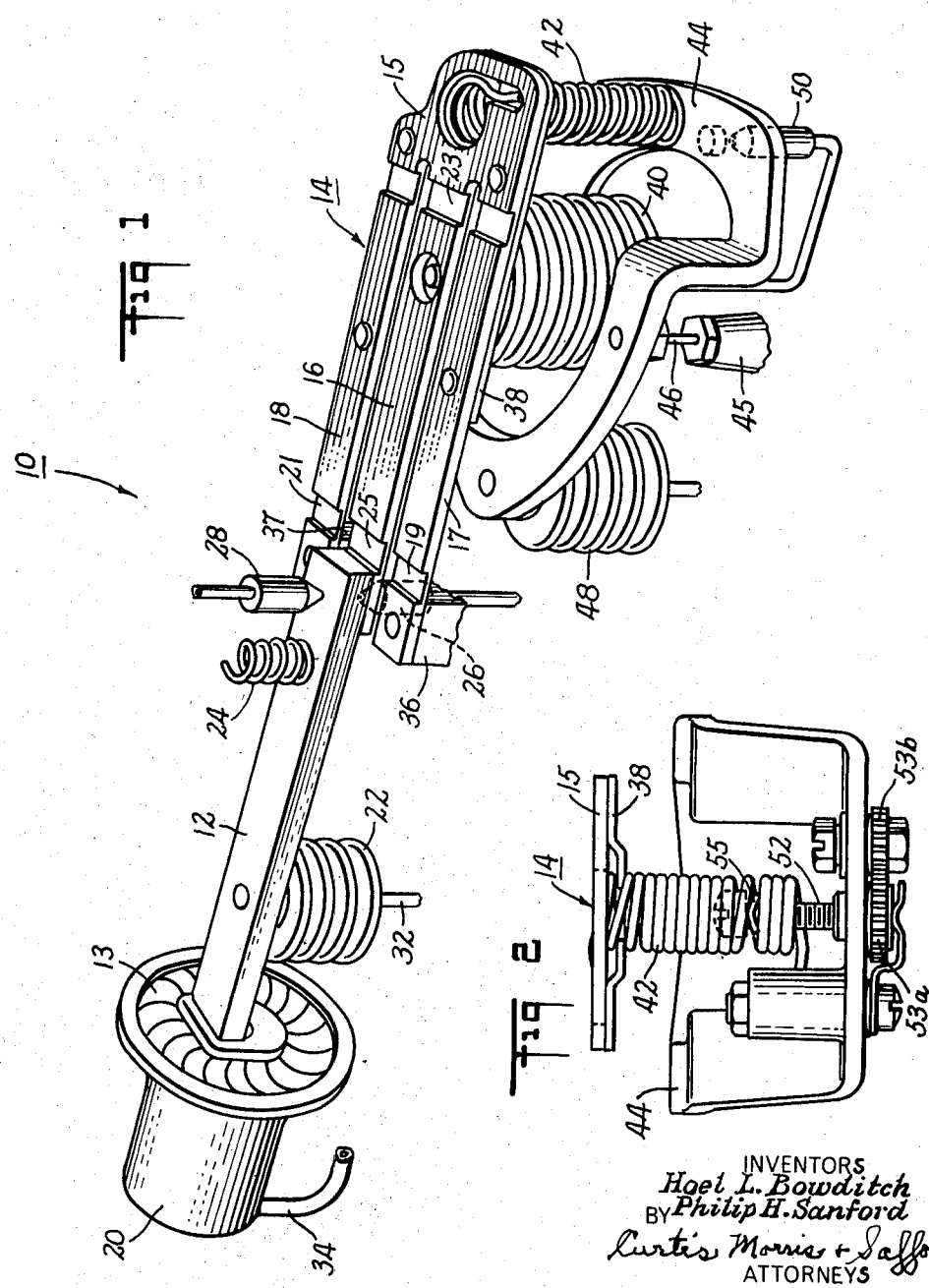
INVENTORS
Hoel L. Bowditch
BY Philip H. Sanford
Curtis, Morris + Safford
ATTORNEYS

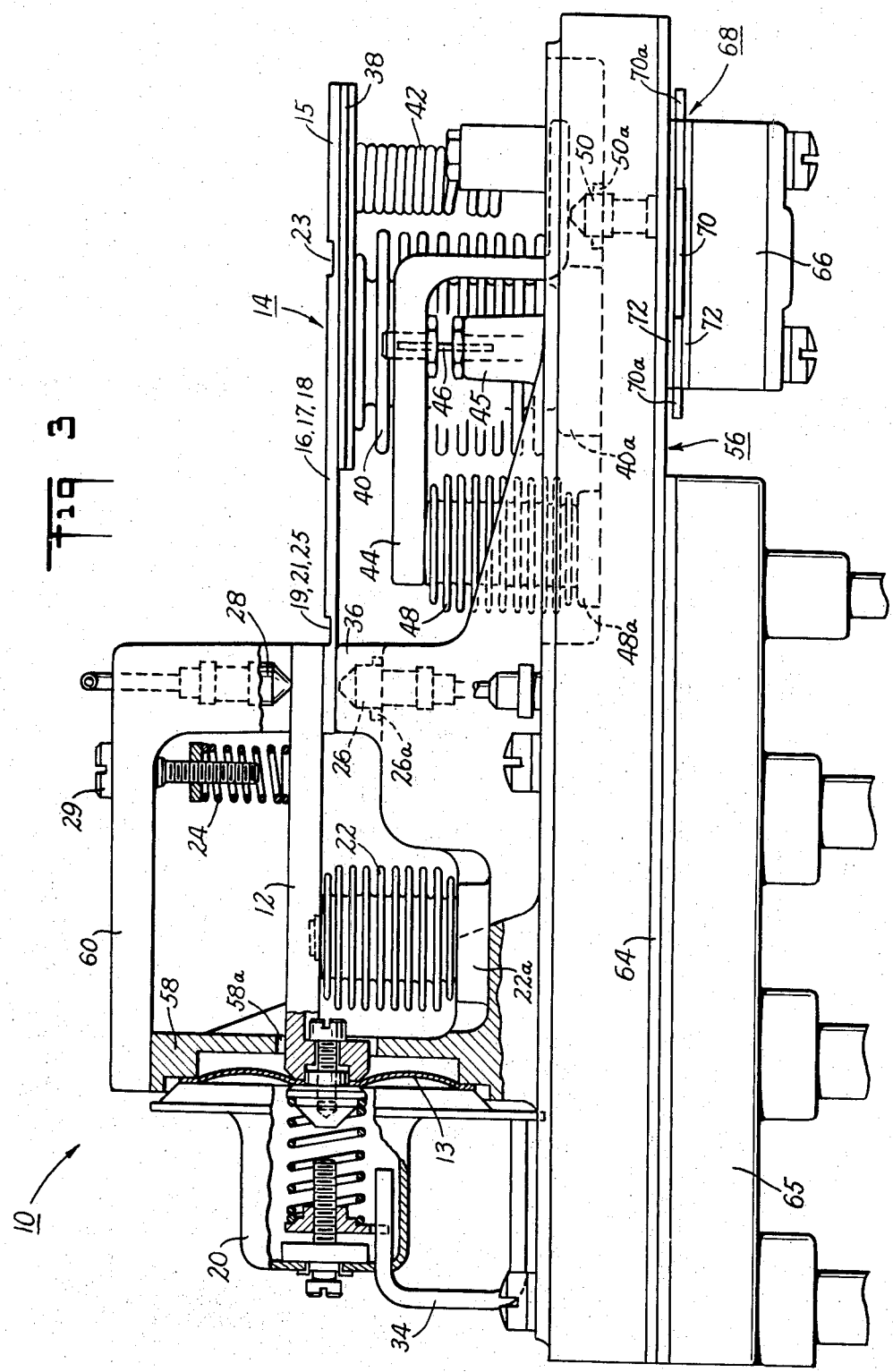

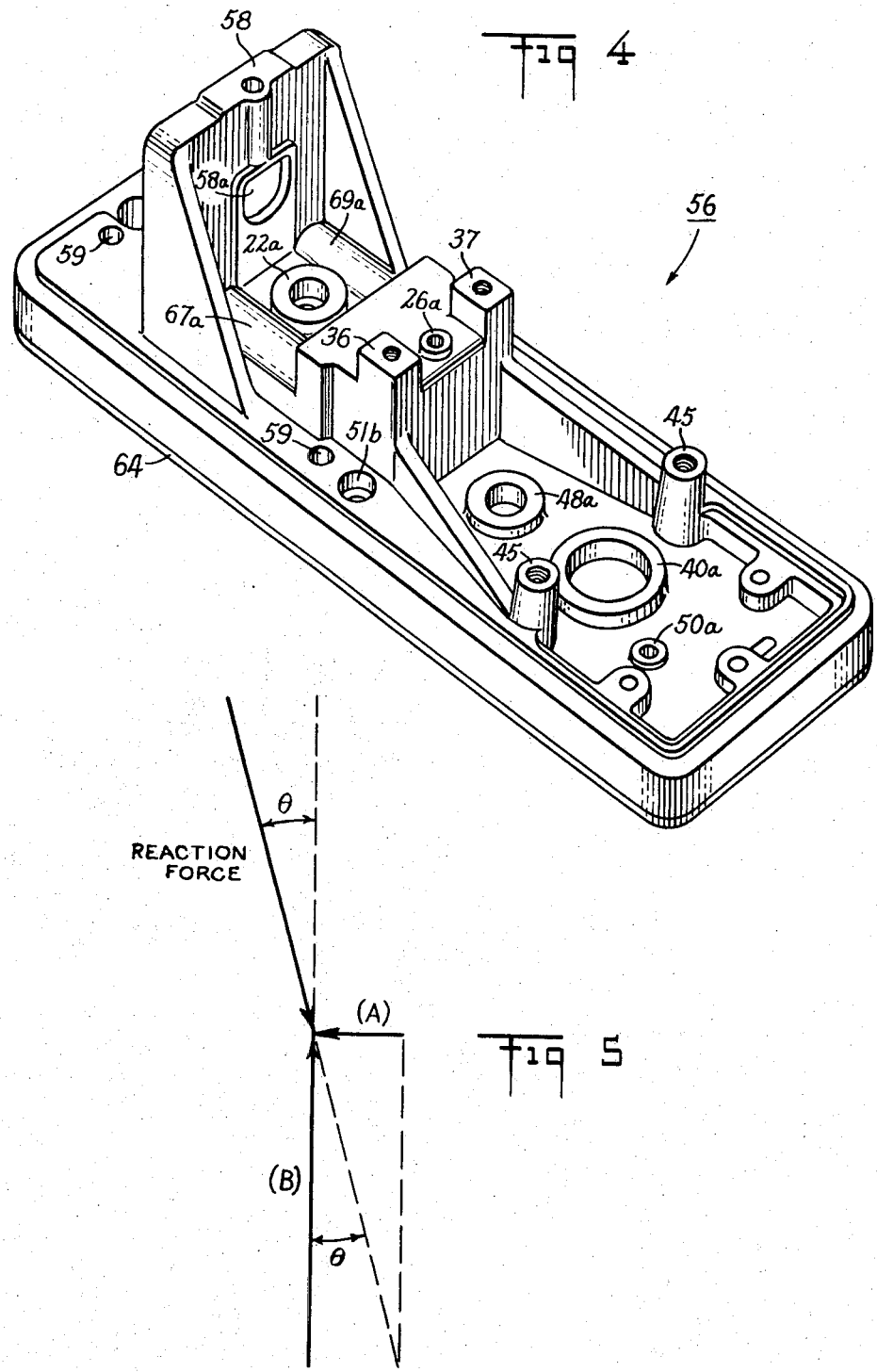

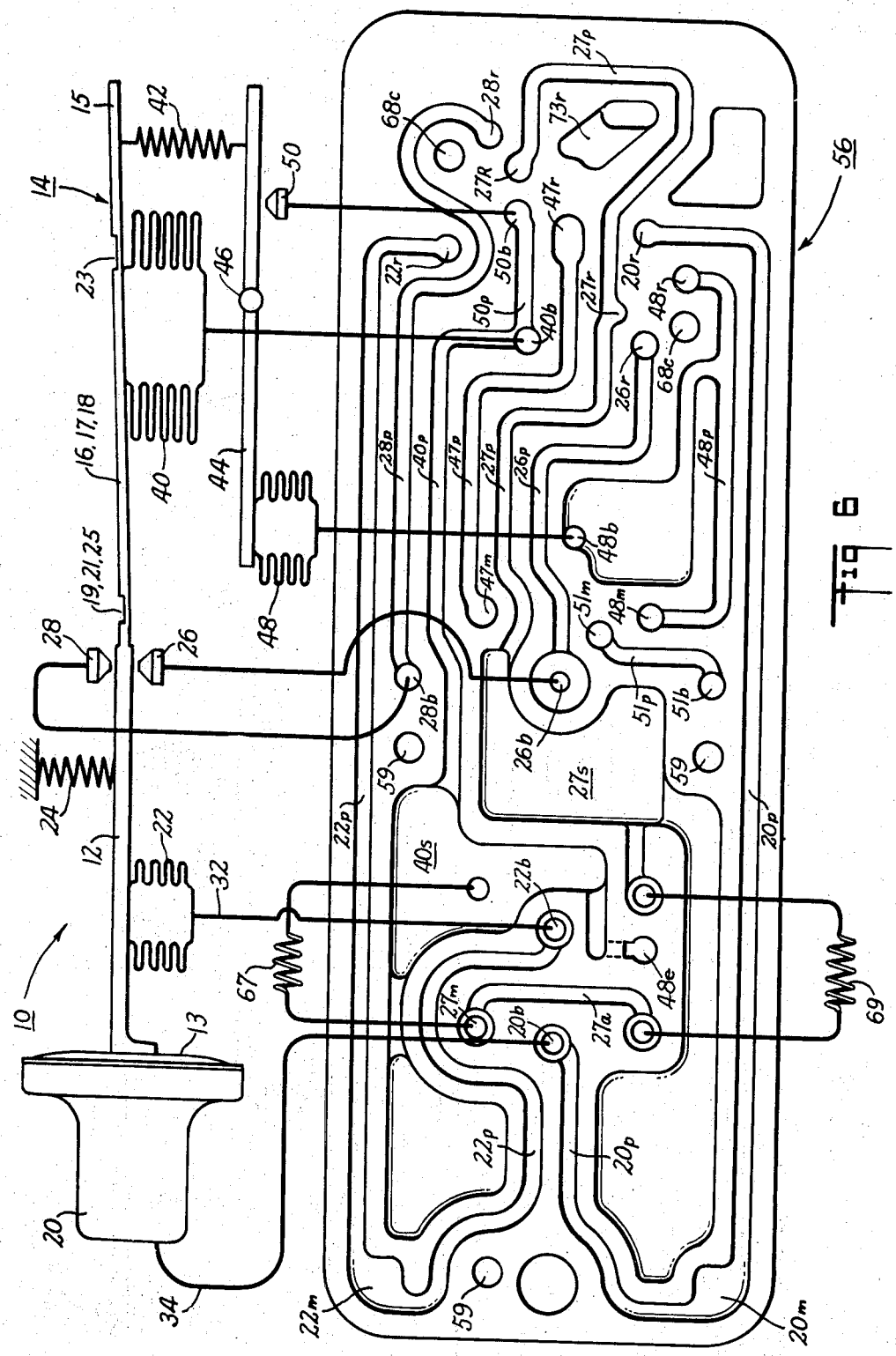

March 5, 1968  H. L. BOWDITCH ET AL  3,371,862
FORCE BALANCE APPARATUS
Original Filed July 2, 1965  7 Sheets-Sheet 5
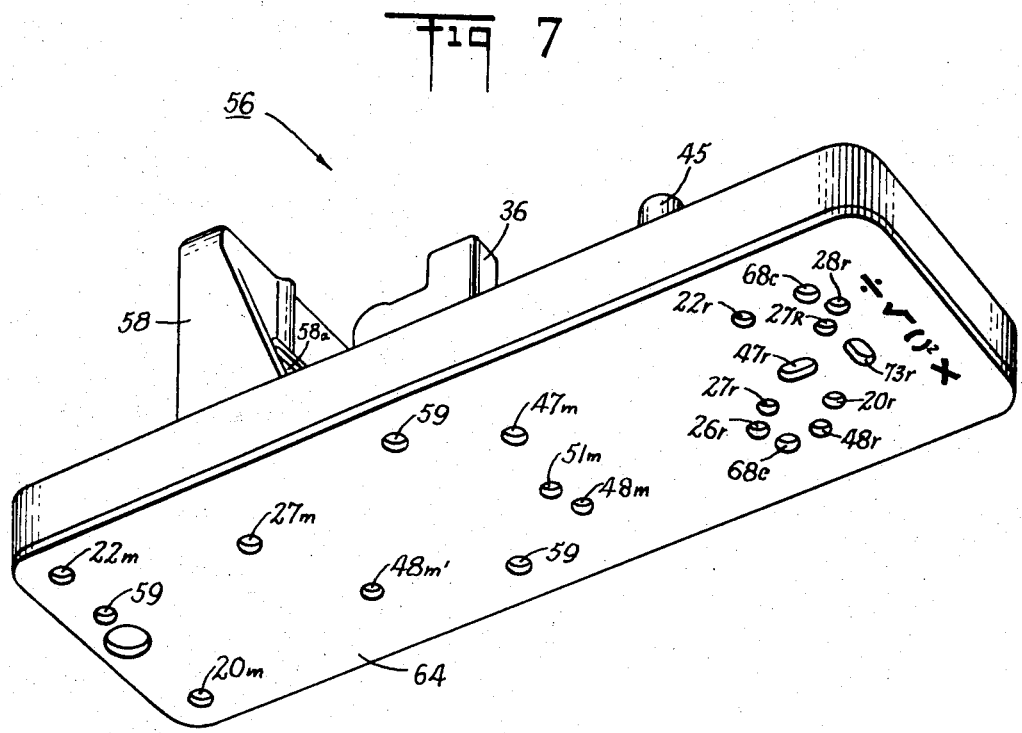
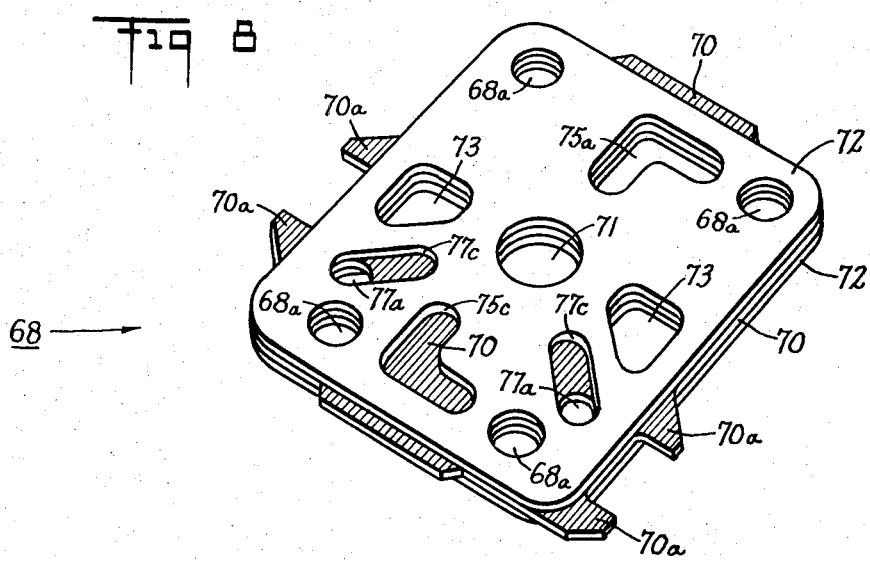

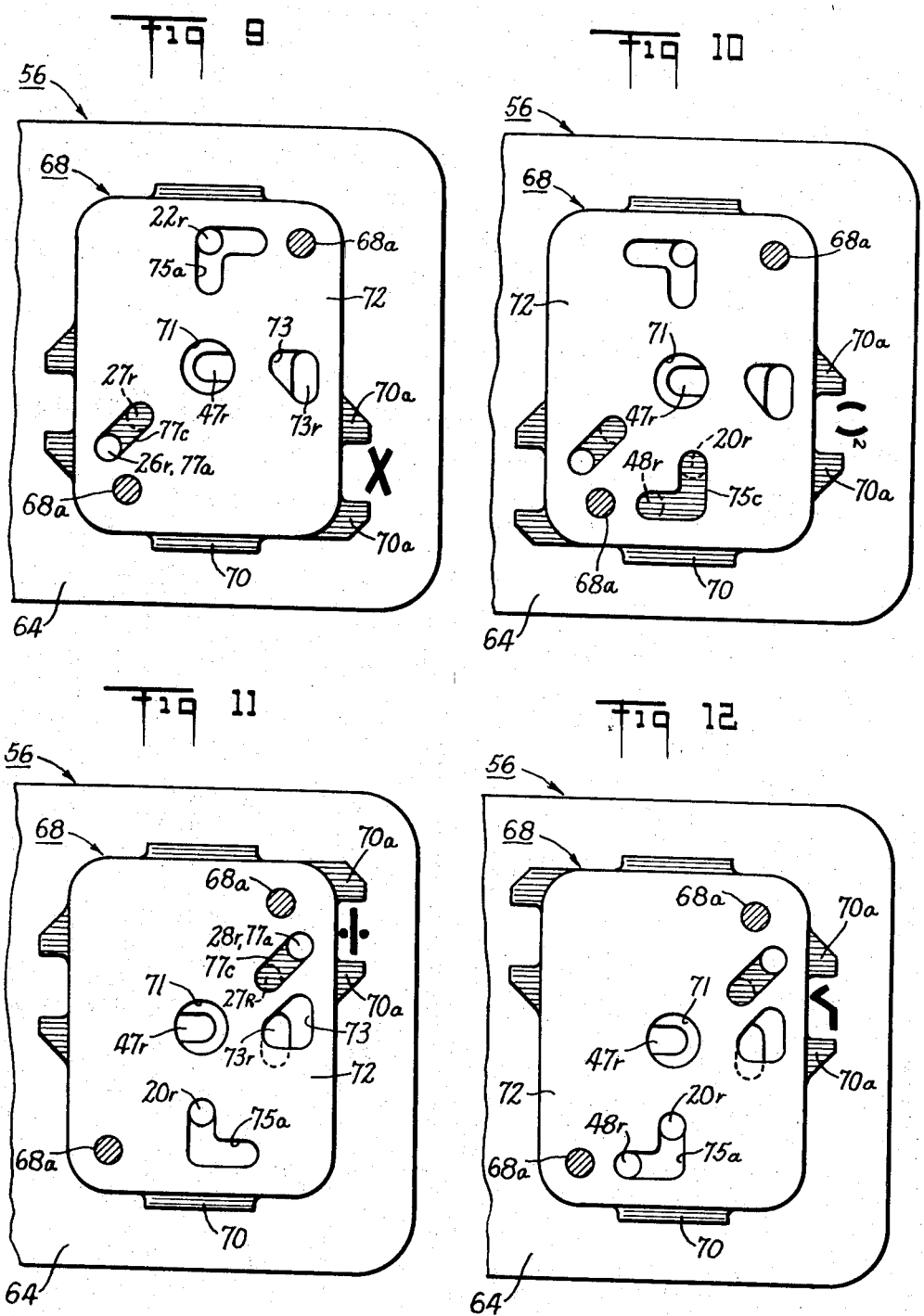

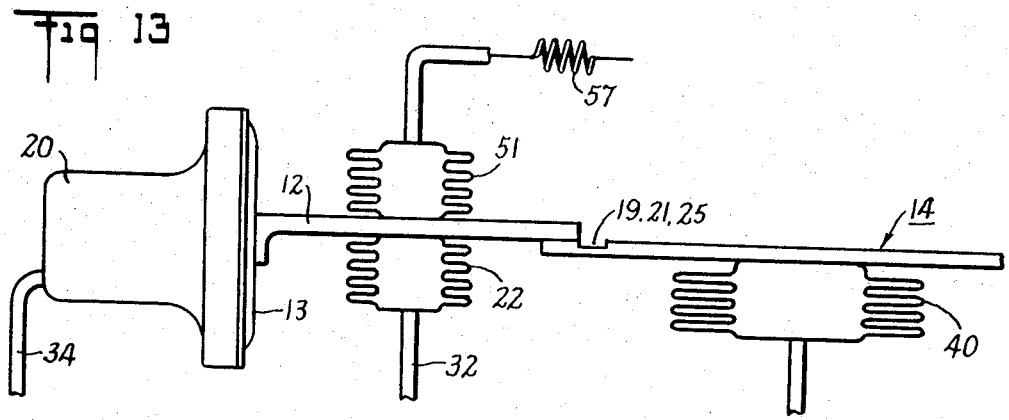
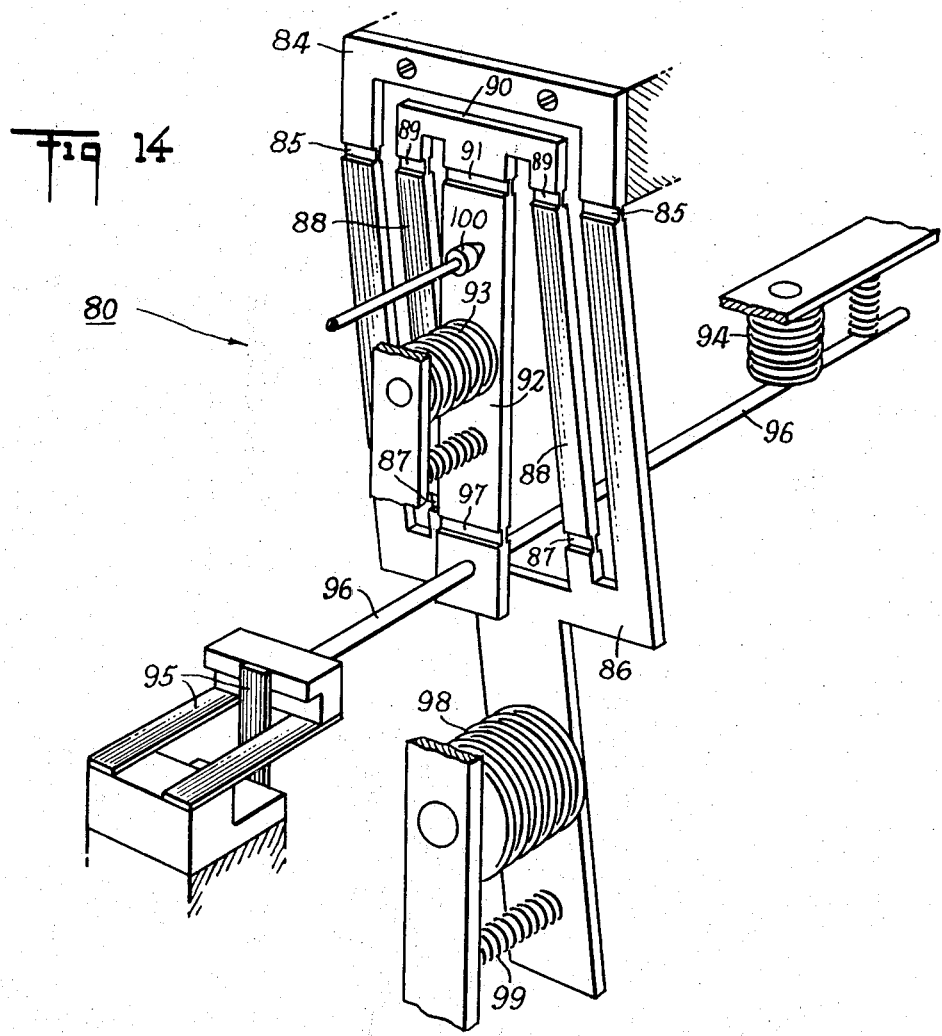

United States Patent Office 3,371,862
Patented Mar. 5, 1968

3,371,862
FORCE BALANCE APPARATUS
Hoel L. Bowditch, Foxboro, and Philip H. Sanford, Walpole, Mass., assignors to The Foxboro Company, Foxboro, Mass.
Original application July 2, 1965, Ser. No. 469,259, now Patent No. 3,325,098, dated June 13, 1967. Divided and this application May 22, 1967, Ser. No. 640,075
12 Claims. (Cl. 235—200)

ABSTRACT OF THE DISCLOSURE

A pneumatic computer for multiplying, dividing, squaring or square-rooting wherein the mathematical result is achieved through balancing two transversely-directed forces, each proportional to a corresponding signal pressure, by an angularly-adjustable reaction element, there being provided a selector plate orientable into different positions to control the pattern of pneumatic connections to the force-producing devices thereby to determine the particular mathematical computation performed.

This application is a divisional of U.S. patent application Ser. No. 469,259, filed July 2, 1965, now U.S. Patent No. 3,325,098.

This invention relates to apparatus for performing mathematical computations such as multiplication, division and the like and, more particularly, to apparatus adapted to receive one or more analog input signals equivalent to numerical values and to produce an analog output signal representing the numerical value of the result of a particular mathematical computation using the value(s) of the input signal(s).

Computers capable of performing various mathematical operations are known. For example, a pneumatic force balance computing device is disclosed in U.S. Patent No. 3,086,702. In that device, two pneumatic signals are directed to respective bellows which apply corresponding forces axially and transversely to a force bar. At one end of the bar is a bearing point through which, by means of a restraining element pivoted thereat, a reaction force whose direction is variable is developed to balance the forces applied to the bar. The direction of the reaction force is determined by a pneumatic signal to a bellows acting on the restraining element. Appropriate pneumatic sensing and feedback means permit the three forces ultimately acting on the bar to be balanced, read out and proportioned to numerical values. More specifically, the restraining element in the balanced condition is at an angle to the longitudinal axis of the force bar and the ratio of the laterally acting force to the axially acting force is proportional to the tangent of that angle. By means of mechanical linkage with the restraining element, the tangent of that angle is made directly proportional to the pneumatic signal controlling the linkage. Thus, the following relationship exists in the force balanced condition: the value of the restraining element controlling signal is proportional to the ratio of the laterally acting signal value to the axially acting signal value, which can be expressed conveniently as $C=A/B$.

An object of this invention is to provide improved pneumatic computers of the general type described in the above-mentioned patent. It is a more specific object to provide such pneumatic computers having improved accuracy. Still another object is to provide computers requiring a relatively small amount of time and labor to calibrate and which remain in calibration over extended periods of use.

Other objects, aspects and advantages of the invention will in part be pointed out in, and in part apparent from, the following description considered together with the accompanying drawings, in which:

FIGURE 1 is a perspective showing the force balancing apparatus of a computer according to this invention;
FIGURE 2 is an elevation showing the balancing apparatus of FIGURE 1 from the right;
FIGURE 3 is an elevation showing a computer according to this invention having the balancing apparatus shown in FIGURE 1;
FIGURE 4 is a perspective showing a computer base and support for the balancing apparatus;
FIGURE 5 is a vector diagram showing the relationship of the balanced forces applied to the force bar of the balancing apparatus;
FIGURE 6 is a plan from below showing the base of FIGURE 4 and a schematic showing the balancing apparatus correlated to the base;
FIGURE 7 is a perspective from below showing the base of FIGURE 4 covered by a base cover plate;
FIGURE 8 is a perspective showing the selector plate for determining the mathematical computation to be performed by the computer;
FIGURES 9 through 12 are plans from below showing fragments of the computer base and the base cover plate, and the operative portions of the selector plate positioned on the cover for the computations of multiplication, squaring, division and square rooting, respectively;
FIGURE 13 is a schematic showing a modification of the balancing apparatus of FIGURE 1; and
FIGURE 14 is a schematic perspective showing another force balancing apparatus of the invention.

Referring now to FIGURE 1, the force balancing apparatus 10 comprises a force bar 12 the left-hand end of which is secured to a diaphragm 13 forming one wall of a chamber 20 to which an air pressure signal can be fed through a pipe 34. Thus, diaphragm 13 applies to bar 12 an axially directed force directly corresponding to that air pressure signal. A transversely directed force is applied to the underside of force bar 12 by a bellows 22.

These two forces applied to bar 12 are balanced by an appropriately directed reaction force developed by a three-element motion-restraining structure generally indicated at 14. The two outer elements 17 and 18 of this structure are connected to respective posts 36 and 37 by flexures 19 and 21 permitting essentially frictionless pivotal movement of the entire structure about these posts within a limited range of movement, e.g., about six degrees. The remote ends of outer elements 17 and 18 are rigidly attached to a head piece 15 which, together with elements 17 and 18 forms a generally U-shaped yoke.

The center element 16 is attached by a flexure 23 to the head piece 15 and by another flexure 25 to the end of the force bar 12, thereby accommodating slight pivotal movements of both the center element 16 and the force bar 12 with respect to the yoke formed by the outer elements 17 and 18.

The various flexures 19, 21, 23 and 25 are integral with the corresponding elements of structure 14, and are formed by making milled, ground cuts through all three elements 16, 17 and 18 to a depth sufficient to provide adequate flexibility at the milled region. Since for the present computer the outer elements 17 and 18 must be rigidly secured to the head piece 15, a U-shaped plate 38 is secured to the underside of these elements and the head piece, thus preventing any flexing between them. Even with this alteration, the forming of the structure 14 with its associated flexures is an economical operation.

The angular position of the yoke about flexures 19 and 21 is controlled by a a large bellows 40 pressing against the underside of the two outer elements 17 and 18, in combination with a tension spring 42 fastened to the end of the head 15. The arrangement is such that the vertical displacement of head 15 is effectively linearly proportional to the force developed by bellows 40, within the operating range of the instrument.

When the forces on bar 12 are in balance, the yoke 15, 17 and 18 is so positioned by bellows 40 that the tangent of the angle $\theta$ (see FIGURE 5) between the force bar 12 and the center restraining element 16 is directly proportional to the ratio of the forces developed by bellows 22 and diaphragm 13, these two forces being referred to herein as forces A and B, respectively. The force of bellows 40 required to achieve this balanced condition is referred to herein as C. Since with very small angles, the tangent $\theta$ is very nearly directly proportional to C, it follows that $A/B$ is effectively equal to $kC$, where $k$ is some constant of proportionality. Written in another form, A equals $kBC$, so that force A is a measure of the product of the forces B and C.

When the instrument is arranged to multiply, the two input signals to be multiplied are represented by the forces developed by diaphragm 13 and bellows 40. The condition of balance of the force bar 12 is sensed by the usual air nozzle 26 mounted beneath the force bar and arranged to operate a conventional pneumatic rebalance system (not shown herein in detail). In this system, the nozzle 26 is connected through a line restrictor to a source of air under presure, typically 20 p.s.i.g. The nozzle also is connected to the input of a pneumatic relay so that the relay output is proportional to the nozzle back pressure, the latter being a function of the spacing of the nozzle from the force bar. The relay output is directed to the bellows 22 to control the transverse force applied to the force bar.

If the forces on bar 12 become unbalanced, e.g., due to a change in pressure in chamber 20, the bar will tend to pivot about diaphragm 13 so as to move closer to or further away from the nozzle 26. When this occurs, the nozzle back pressure will change, thus altering the pressure in bellows 22 so as to restore the condition of force balance. Since the nozzle back pressure varies over its entire range with a change in spacing of less than about 0.001 inch, it will be evident that the amount of movement of bar 12, as it shifts to its new position of balance, is extremely small. When the forces are rebalanced, the altered pressure in bellows 22 (force A), will be proportional to the new product of forces B and C as developed by diaphragm 13 and bellows 40.

It will be evident that all of the pivotal movements of force bar 12 and the three elements of support structure 14 are accommodated entirely with flexures, i.e., without the use of any friction-type bearings. This provides a very high accuracy of computation since it eliminates errors due, for example, to the dead space and friction inherent in sliding surface bearings, regardless of how finely constructed. This all-flexure construction was made possible as a result of the concept that the entire operating range of the instrument could be handled within a relatively few degrees of movement of support structure 14, providing that the relative magnitudes of the forces A and B were suitably adjusted. Although the normal tendency would be to use a large amount of motion of the force bar restraining elements (because with limited movements error-producing effects tend to be relatively magnified), it has been found nevertheless that the overall operation is improved by the present construction due to the fact that the movement is sufficiently limited that it can be accommodated entirely by non-friction bearings of the flexure type.

Since the force produced by bellows 40 depends not only on its internal pressure but, to some degree, on how far the bellows has been distended, i.e., on the angular position of support structure 14, it may be desirable in some applications to provide means for assuring that the bellows force is directly proportional to an input pressure signal. This is accomplished in the present embodiment with a servo-balancing device by connecting the bottom of spring 42 to the right-hand end of a pivotally mounted rocker beam 44, the other end of which receives the force developed by a small input bellows 48 to which the input pneumatic pressure signal is directed. A sensing nozzle 50 mounted beneath the right-hand end of beam 44 detects any condition of unbalance and is connected to bellows 40 to maintain the pressure thereof at a level to assure balance of beam 44.

Since beam 44 never moves more than about 0.001 inch, the input bellows 48 is not distended nor compressed as the instrument varies over its input range. Thus the force of bellows 48 is essentially directly proportional to its applied pressure. The tension force of spring 42 is directly proportional to the input bellows force, because beam 44 is held in balance. Put another way, the force applied by bellows 40 to the yoke 15, 17 and 18 corresponds directly to the input pressure signal at bellows 48 regardless of changes in angular position of the structure 14.

Beam 44 is pivotally mounted on respective upstanding wire segments 46 which are circular in cross-section. These wire segments bend with a flexing movement to provide an essentially frictionless bearing for the beam 44, thus further enhancing the accuracy of computation.

FIGURE 2 additionally shows within the spring 42 a screw 52 accessible from above to adjust the span of the flexure structure 14. The screw has a spacer 55 between the coils of the spring 42. Turning the screw alters the number of active coils of the spring 42. A pair of engaging rotatable gears 53a and 53b on the lower end of the screw 52 and the beam 44, respectively, are for zeroing the position of the flexure structure.

FIGURE 4 illustrates the base 56 of the computer. An upstanding frame 58 supports the chamber 20 and diaphragm 13, and has a slot 58a through which the force bar 12 passes. The base 56 has circular seats 22a, 40a and 48a for the bellows 22, 40 and 48; anchor posts 36 and 37 for the flexure structure 14; and pedestals 45 for the wire supports 46 for the beam 44. Also, the base has seats 26a and 50a for the rebalance nozzle 26 and the beam rebalance nozzle 50. A bracket 60 (see FIGURE 3) extends from the frame 58 to the posts 36 and 37 and supports a biasing spring 24 for the force bar 12 and an alternative rebalance nozzle 28. The "zero" position of the force bar 12 is adjusted by altering the compression on the spring 24 with a screw 29.

FIGURE 6 shows the underside of the base 56 having tortuous passages for the pneumatic signals of the computer. The base preferably is cast with recesses forming the passages therein. FIGURE 6 also shows a schematic elevation of the balancing apparatus 10 and the communication paths between the passages in the base 56 and the various balancing components. Bores 20b, 22b, 26b, 28b, 40b, 48b and 50b in the base permit connections between the passages (indicated by the same numerals and the letter "p") and the chamber 20, the bellows 22, 40 and 48 and the rebalance nozzles 26, 28 and 50.

FIGURE 7 shows a cover plate 64 over the underside of the base 56 closing off the various recesses to form the pneumatic passages. The cover 64 has a multiplicity of openings to connect the passages with a signal and supply manifold 65 (FIGURE 3) and a pneumatic relay 66 secured to the base 56 over the cover 64. For ease of following the various signal paths of the computer, lower case letters are used with the reference numerals to indicate the following associations: r for the relay 66, m for the manifold 65, p for the passages in the base and b for bore openings in the base leading from the passages to the various components such as bellows and nozzles. Three screw holes 59 are also provided for mounting the manifold in order to assure a secure, rock-free seating of the manifold against its sealing gasket; and two screw holes 68c are provided for the relay.

FIGURE 8 shows a selector 68 for controlling the nature of the mathematical operation to be performed. This selector is placed between the relay 66 and the base cover 64 in any one of four different orientations (as shown in FIGURES 9 to 12), and conditions the computer for multiplication, squaring, division or squarerooting, respectively.

The selector 68 has a central metal plate 70 on each side of which are laminated identical gaskets 72. Small lugs 70a projecting from the plate 70 are provided to identify the setting of the selector, as will be evident from the discussion hereinbelow. Bores 68a in each corner are to position the selector on screws which mount the relay 66 on the base 56. Pneumatic connections through the selector are provided by a center bore 71, two smaller bores 77a, two larger trapezoidal openings 73 and an L-shaped opening 75a. In addition to cut-outs for those openings, the gaskets 72 have two oblong cut-outs 77c and an L-shaped cut-out 75c. Selector openings 73 communicate with an opening 73r in the base leading to a vent. In FIGURES 9 to 12, only the selector connections actually operative for the particular computation illustrated are shown on the selector 68.

The signal manifold 65 fits over a portion of the base cover 64 through openings of which are transmitted the pneumatic input signals as well as the required supply air pressure. For example, there is a connection from the manifold through opening 20m to passage 20p and thence through opening 20b to chamber 20. Similarly, through opening 22m to passage 22p and thence through bore 22b to bellows 22. Supply air (20 p.s.i.) is furnished to relay 66 through opening 47m which connects with passage 47p leading to opening 47r and thence through selector bore 71 to the relay. Supply air for the nozzles passes through opening 27m into passage 27a connecting with two line restrictors shown schematically at 67 and 69. These restrictors physically are mounted horizontally in the base 56 in the positions indicated at 67a and 69a in FIGURE 4, and are accessible from the opposite side of frame 58, just below the chamber 20.

The output end of restrictor 69 leads to a large volume stabilizing chamber 27s connecting to a passage 27p. This passage communicates (when selector 68 is in position for multiplying) through opening 27r, oblong cut-out 77c, opening 26r, passage 26p, and bore 26b to nozzle 26. The nozzle signal also passes through selector bore 77a to the relay 66 so that the latter can produce a corresponding output pressure signal through opening 22r, passage 22p and bore 22b to the bellow 22.

The output end of the other restrictor 67 enters a stabilizing chamber 40s leading to a passage 40p which communicates through bore 50b with nozzle 50 and through another bore 40b with the bellows 40.

Two values to be multiplied are applied from the manifold 65 as respective pressure signals to chamber 20 and bellows 48 to provides forces B and C, the selector 68 being positioned as shown in FIGURE 9. The back pressure of nozzle 26 enters the relay 66 through bore 77a and the relay output passes through openings 75a and 22r to bellows 22 to provide force A. This same pressure signal also enters the manifold through opening 22m as the computer output signal indicating the product of the two values being multiplied.

To square a value, the selector 68 is turned over to the position shown in FIGURE 10. The multiplication operation is repeated except that a single input value to be squared is entered from the manifold 65 as both force B and force C. The L-shaped cutout 75c in the selector gasket 72 provides a passage between the openings 20r and 48r so that the pressure in the passages 20p and 48p will be equal. Since these passages lead to chamber 20 and bellows 48, the forces B and C will be equal.

To divide, the selector 68 is positioned as shown in FIGURE 11. A signal representing the dividend is applied through the various passages to bellows 22 as force A and a signal representing the divisor is applied to bellows 48 to develop force C. The rebalancing signal developed by the relay enters the passage 20p through the openings 75a and 20r to establish the rebalancing force B in the chamber 20, the pressure of which also is read out from the manifold 65. The relay output is controlled by the back pressure in passage 28p from the rebalancing nozzle 28 which enters the relay through openings 28r and 77a.

The square root of any value can be obtained by the division process by putting the value into the computer as force A and equating the divisor, force C, and the quotient, force B, i.e., by positioning the selector 68 as shown in FIGURE 12 so that the relay rebalancing output signal passes through the L-shaped opening 75a in the selector and bores 20r and 48r to the passages 20p and 48p.

A computer of the type disclosed herein also can advantageously be used as a process controller. For example, an error signal developed from the output of a condition-sensing instrument, such as a flow meter, can be fed as the input signal B to the computer. The computer output, in this case the rebalance pressure fed to bellows 22 to produce force A, is directed to a process controlling element such as a flow valve. The force C of the computer, which relates forces A and B, serves as a proportioning band setting. That is, the magnitude of C determines the magnitude of the controller output signal responsive to the error input signal. One important advantage of the disclosed arrangement is that the proportioning band can conveniently be controlled remotely by transmitting an appropriate pneumatic signal to the C input.

Another embodiment of the invention in connection with the use just described provides a reset function in addition to proportioning action. The embodiment is schematically illustrated in FIGURE 13 which shows a balanceable apparatus similar to the one depicted in FIGURE 1, but with less detail.

In this modification, second lateral bellows 51 acts on the force bar 12 on the opposite side thereof from the bellows 22. The process controlling output signal of the pneumatic relay is, of course, fed to the bellows 22 to balance the apparatus. It also is fed to the lateral bellows 51, but through a line restrictor 57 so the signal 51 lags behind the signal to bellows 22. Since the forces of bellows 22 and 51 oppose one another, their difference being the rebalancing force, it will be evident that, upon the introduction of a constant input error signal, the output pressure will initially change by a corresponding amount (the proportioning factor C), and thereafter this change will continuously increase to provide the effect of a reset function. Ultimately, of course, the process condition will be corrected and the error signal will return substantially to zero.

The lateral bellows 51 can be used independently of bellows 22, i.e., to provide a third input force D, to modify the basic equation to (disregarding constants of proportionality):

$$A=BC+D$$

The signal D to bellows 51 passes from the manifold through opening 51m, passage 51p, bore 51b and a flexible hose (not shown) to the top of the bellows. The positioning of this bellows preferably is adjustable along the force bar, by conventional means, for the purpose of altering the magnitude of the D factor as required for particular mathematical operations.

The computers disclosed herein also can be operated by feeding the C input signal directly to the large bellows 40, although with some loss in accuracy. In such case, bores 48b and 50b are not made in the base, but a passage (shown by broken lines in FIGURE 6) is milled or drilled between a recess 48e and stabilizing chamber 40s. The input signal for the bellows 40 enters the base from the manifold 65 through opening 48m' to recess 48e and thence to chamber 40s, passage 40p and through opening 40b to the bellows 40. The line restrictor 67 is eliminated. Openings 48m' and 48m are connected within the manifold 65 so that for squaring and square rooting, the signal to the chamber 20 in passage 40p is equated to the signal to bellows 40 through the passage 48p by the selector 68.

Another embodiment of the invention is illustrated in FIGURE 14. It is in principle the same as the one previously described in that they both utilize flexures rather than bearing and/or pivot points. The structure generally indicated at 80 includes a frame member 84 having flexures 85 mounting a U-shaped yoke 86. A pair of parallel reaction arms 88 are mounted on yoke 86 by flexures 87, and are attached at their opposite ends by flexures 89 to a cross-piece 90. A flexure 91 pivotally mounts a force bar 92 to this cross-piece.

The lower end of this force 92 is connected by a flexure 97 to a transverse lever arm 96 anchored at one end by a cross-flexure 95. A spring-biased bellows 94 acts an the lever arm 96 to apply a longitudinal force B to the force bar 92. Another spring-biased bellows 93 acts against the force bar 92 to apply a lateral force A thereto. A third bellows 98 applies a force C to the yoke 86 which deflects it and the reaction arms 88, preferably not more than in the range of 5 to 7°, against spring means 99 having a substantially linear deflection/stress characteristic so that throughout the relatively small angular deflection of the yoke 86 the tangent of the angular displacement $\theta$ about the flexures 85 is very nearly directly proportional to the applied signal. A rebalancing system, including at least one nozzle 100 and the usual relay (not shown), is used to maintain the forces on bar 92 in balance. In the balanced state the moments developed by forces A and B on the reaction arms 88 about the flexure 87 are equal so that $$k_1 B (d \sin \theta) = k_2 A (d \cos \theta)$$

where $d$ is the length of the reaction arms 88 and, by transposition and substitution, $$A/B = k_1/k_2 \tan \theta = k\theta = C$$

where $k$ is a constant determined by the geometry of the apparatus. Thus the same basic relationship is established as in the first-described preferred embodiment, and it will be evident that comparable auxiliary structure can be provided to utilize this relationship for performing the desired mathematical computations.

It is to be understood that the foregoing description illustrates the invention and various specific embodiments thereof, and that numerous changes can be made by those skilled in the art without departing from the invention as limited by the prior art.

We claim:

1. Force-balance apparatus comprising a plurality of pressure-responsive means adapted to exert forces corresponding to fluid pressure transmitted thereto, mechanical means operably connecting said pressure-responsive means to receive the forces exerted thereby, rebalance means responsive to movement of said mechanical means for developing a rebalance signal adapted to adjust the magnitude of at least one of said fluid pressure so as to maintain said forces in balance, first connection means formed with at least one passage for conveying a fluid pressure to serve as an input signal for said pressure-responsive means, second connection means formed with a plurality of passages for transmitting fluid pressure to said pressure-responsive means, and selector means formed with at least one passage adapted to provide fluid pressure communication between said first and second connection means, said selector means being arranged to be oriented selectively in at least first and second positions, said selector means providing in said first position a first pattern of interconnections between said first and second connection means producing a corresponding first mode of operation of said force-balance apparatus, said selector means providing in said second position a second pattern of interconnections between said first and second connection means producing a second mode of operation of said force-balance apparatus.

2. Apparatus according to claim 1 further comprising a base on which said pressure-responsive means are mounted and serving as said first connection means for conveying a fluid pressure input signal to said pressure-responsive means.

3. Apparatus according to claim 2 wherein said base also serves as said second connection means, the passages of said first and second connection means comprising grooves formed in one exterior surface of said base, said selector means comprising a thin flat element mounted on said surface of said base to establish patterns of interconnection among said passages in accordance with the position in which said element is placed.

4. A pneumatic computer for performing a plurality of different kinds of mathematical computations and adapted to be altered quickly and simply from one mode of computation to another mode of computation, said pneumatic computer comprising a base, a rebalanceable member mounted on said base, first and second pressure-responsive means mounted on said base to apply to said rebalanceable member first and second transversely-directed forces proportional to the respective fluid pressures, a reaction element engaged with said rebalanceable member to produce a reaction force opposing the vector combination of said first and second forces, third pressure-responsive means adapted to control the angular positioning of said reaction element, feedback means responsive to any unbalance of forces on said rebalanceable member for adjusting at least one of the pressures applied to said pressure-responsive means to maintain the forces in balance; said base being formed with a first set of passages for conveying fluid pressures to said pressure-responsive means, connection means formed with a second set of passages for conveying fluid pressures corresponding to input and output signals from said pneumatic computer, and selector means formed with a plurality of passages and located adjacent said base to establish interconnections between said first and second sets of passages, said selector means being arranged to be oriented in at least first and second positions, said selector means providing in said first position a first pattern of interconnections between said first and second sets of passages producing a corresponding first mode of computation, said selector means providing in said second position a second pattern of interconnections between said first and second sets of passages producing a second mode of computation.

5. Apparatus according to claim 4 wherein said base serves also as said connection means, said first and second sets of passages comprising adjacent grooves formed in one exterior surface of said base, said selector means comprising an element spanning said first and second sets of passages in both said first and second positions.

6. Apparatus according to claim 5 wherein said selector means comprising a plate secured on one side to said surface of said base, and a pneumatic relay secured to the other side of said plate, said plate being formed with holes therethrough providing connections between said relay and selected passages in said base as determined by the positioning of said plate.

7. Apparatus according to claim 6 wherein said base is provided adjacent a side edge of said plate with graphic indicia denoting said different modes of mathematical computation, and indicator means integral with said plate for identifying different graphic indicia in different positions of said plate, the graphic indicia identified in any one position signifying the mode of mathematical computation effected by the pneumatic computer with the selector plate in that position.

8. Force-balance apparatus comprising a plurality of pressure-responsive means each adapted to exert a force corresponding to a fluid pressure transmitted thereto, mechanical linkage means operably connected to said pressure-responsive means to receive the forces exerted thereby, sensing means coupled to said linkage means for producing a corresponding fluid pressure rebalance signal to balance said forces, connection means formed with first passages for communicating with said pressure-responsive means and said rebalance means, signal-responsive means adapted to receive an input pressure signal and to produce a corresponding output pressure signal, and selector means connected to said signal-responsive means and having second passages therethrough communicating with said first passages to form continuous passages for transmitting fluid pressures between said signal-responsive means, said pressure-responsive means and said sensing means, said selector means having a plurality of positions in each of which the pattern of said continuous passages is different from the pattern of said continuous passages when said selector means is in another position.

9. Apparatus according to claim 8 further comprising a base on which said pressure-responsive means and said signal-responsive means are mounted and having said first passages therein.

10. Apparatus according to claim 9 wherein said selector means is a thin flat element mounted between said base and said signal-responsive means.

11. Apparatus according to claim 10 wherein said selector means is a laminate of a metal piece sandwiched between two pieces of a substantially impervious resilient material.

12. Apparatus according to claim 10 wherein said selector is adapted to be positioned with either large flat surface against said base.

References Cited
UNITED STATES PATENTS

| | | | |
|---|---|---|---|
| 3,156,157 | 11/1964 | Smith et al. | 235—201 |
| 3,239,139 | 3/1966 | Chapin et al. | 235—200 |

RICHARD B. WILKINSON, *Primary Examiner.*

L. R. FRANKLIN, *Assistant Examiner.*